(No Model.)
H. HARMER.
SAFETY SWITCH GUARD.
No. 289,254. Patented Nov. 27, 1883.
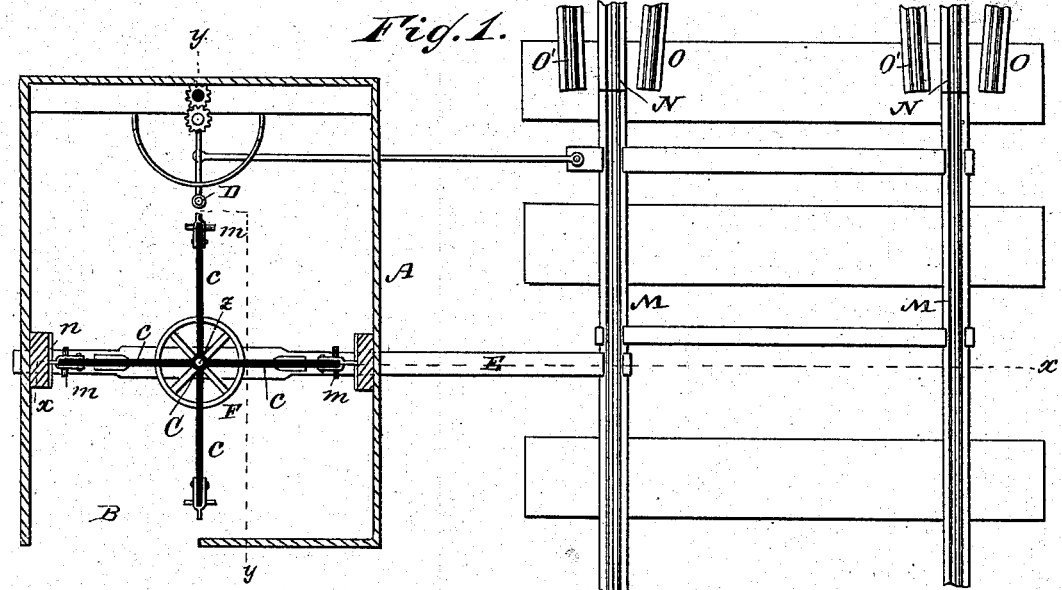
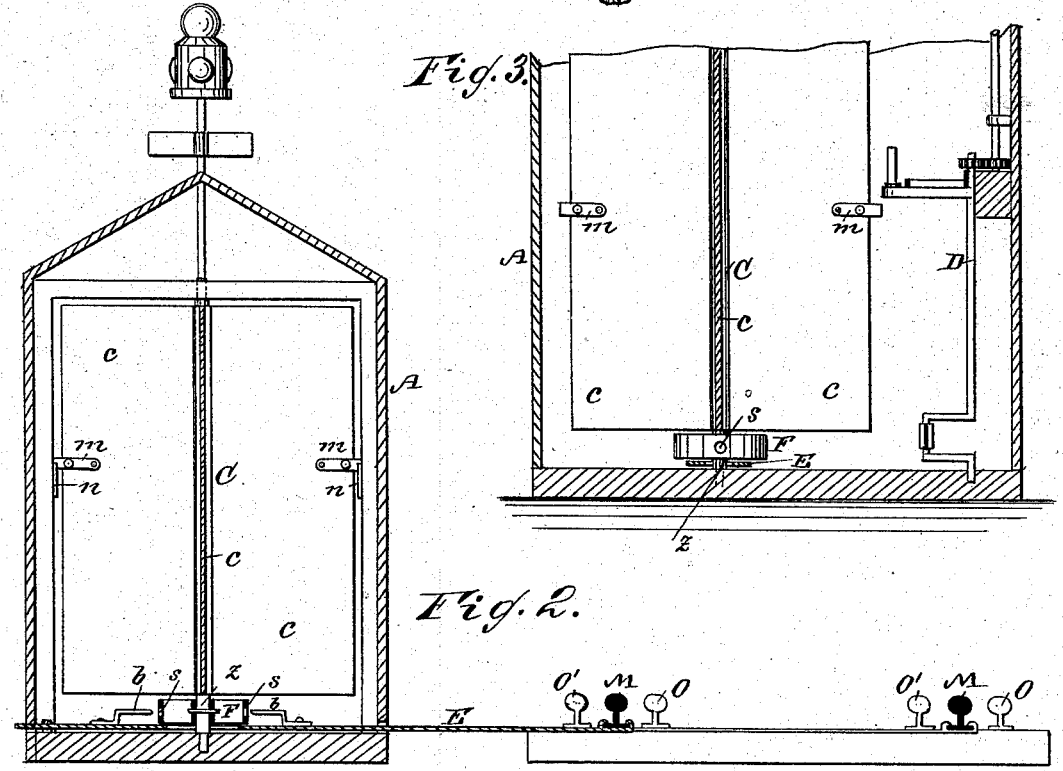
WITNESSES:
Theo. G. Hoster
C. Sedgwick
INVENTOR:
H. Harmer
BY Munn & Co.
ATTORNEYS.

UNITED STATES PATENT OFFICE.

HENRY HARMER, OF SOUTHAMPTON, ONTARIO, ASSIGNOR TO FREDERICK BROUGHTON, OF HAMILTON, CANADA.

SAFETY-SWITCH GUARD.

SPECIFICATION forming part of Letters Patent No. 289,254, dated November 27, 1883.

Application filed August 16, 1883. (No model.) Patented in Canada August 22, 1874, No. 3,770; extended August 20, 1879, No. 10,375.

*To all whom it may concern:*

Be it known that I, HENRY HARMER, of Southampton, in the county of Bruce, Province of Ontario, and Dominion of Canada, have invented certain new and useful Improvements in Safety-Switch Guards, of which the following is a full, clear, and exact description.

This invention relates to devices for preventing accidents to railroad-trains by reason of the switches on the line being improperly left open, and in which the switch-operating mechanism is contained within a house or structure into which the switchman is compelled to enter in order to adjust the switch, and from which egress is automatically controlled by the switch-operating mechanism in such manner that the switchman cannot leave the house or structure until, after connecting the switch with a siding, he has reconnected it with the main line; and the invention consists in a new and useful combination or combinations of means for accomplishing this end, whereby great simplicity and efficiency are obtained.

In carrying out my invention the house or structure, which is erected over the switch-lever, and may be a frame one, is only made sufficiently large to permit the switchman to enter and, when inside, to move the switch-lever. The egress of the switchman from the house, as long as the switch is open and disconnected from the main line, is prevented by a turnstile carried by a vertical shaft in the central portion of the house. At or near the bottom of this shaft, and revolving with it, is a horizontal hub or wheel containing sockets or holes corresponding in position to the cross-wings or doors of the turnstile above. Connected with the switch is a slide-bar, which is worked by the switch-lever, and which enters one of the sockets in the horizontal hub or wheel when the switch is opened, and which is only withdrawn from it when the switch is closed and reconnected with the main line. So long as said slide-bar remains in the socket of the horizontal wheel the wheel, the vertical shaft, and the turnstile are immovable. When, however, the slide-bar is withdrawn, which can only be done by closing the switch—that is, reconnecting it with the main line—then the wheel, shaft, and turnstile are at liberty to revolve, thereby permitting ingress and egress.

Reference is to be had to the accompanying drawings, forming part of this specification, in which similar letters of reference indicate corresponding parts in all the figures.

Figure 1 is a horizontal section of the apparatus, shown as applied to controlling a switch, also exhibiting, in part, the rails of the main line and the rails of duplicate sidings, with and from which the switch is made to connect and disconnect. Fig. 2 is a vertical section of the same upon the line $x\,x$ in Fig. 1, and Fig. 3, a further vertical section in part upon the irregular line $y\,y$ in Fig. 1.

A is the house over the switch-lever, and which need not exceed in horizontal dimensions six feet by four feet six inches, or thereabout.

B is the entrance to the house, and C the turnstile in the house, by which ingress and egress are automatically controlled through the operation of the switch, said turnstile having the requisite number of wings or doors $c\,c$, and revolving in common with the vertical shaft Z, which carries it, and on the lower portion of which is the locking hub or wheel F.

E is the slide-bar, worked by the switch crank or lever D, and which is disconnected from the wheel F when the switch M is in connection with the rails N N of the main line, thus allowing the wheel F, shaft Z, and turnstile C to revolve, and consequently afford free ingress and egress for the switchman. To secure the operation of the slide-bar E by the switch crank or lever D, both of said devices are directly, but separately, connected with the switch.

$s\,s$ are the sockets or holes in the wheel F, into which one or other of two bolts or fixed arms, $b\,b$, on the slide-bar E enters when the switch is connected with the siding-rails O or O'. The wheel F, shaft Z, and turnstile C are then immovable, and egress from the building is, by the position of the wings or doors $c\,c$, impossible, and remains so until the slide-bar E is withdrawn from the socket or hole *s* in the wheel F, which can only be done by disconnecting the switch from the siding and reconnecting it with the main line, as shown in Fig. 2. Applied to the turnstile—as, for instance, to each of its wings or doors *c*—is a drop or spring-catch or fastening, *m*, which automatically engages with a keeper, *n*, in the house to hold the turnstile in position, as it is revolved to insure one of the holes or sockets *s* in the wheel F coming and remaining opposite the slide-bar E, or bolt *b* thereon, for engagement of said bar with said hub or wheel. Application of the thumb to said catch, or to a latch controlling the same, serves to release the catch when required.

I do not abandon or dedicate to the public any patentable feature set forth herein and not hereinafter claimed; but reserve the right to claim the same, either in a reissue of any patent that may be granted upon this application, or in any other applications for Letters Patent that I may make.

Having thus described my invention, what I claim as new, and desire to secure by Letters Patent, is—

1. The combination, with the switch and its operating mechanism, of the house A, the turnstile C, with its shaft Z, and attached locking hub or wheel F, and the slide-bar E, connected with the switch and arranged to engage with said wheel or hub when the switch is open, or in connection with a siding, substantially as specified.

2. In a safety-switch guard, the combination, with the switch and its operating mechanism, house A, turnstile C, shaft Z, locking wheel or hub F, and engaging slide-bar E, connected with the switch, of the automatically-engaging catches or fastenings *m*, and one or more keepers, *n*, arranged to hold the turnstile in locking position with the slide-bar, essentially as herein described.

HENRY HARMER.

Witnesses:
WM. J. HOLDEN,
J. F. CONAWAY.